H. S. MORGAN.
STEERING WHEEL.
APPLICATION FILED DEC. 24, 1914.
1,220,878.
Patented Mar. 27, 1917.
2 SHEETS—SHEET 1.
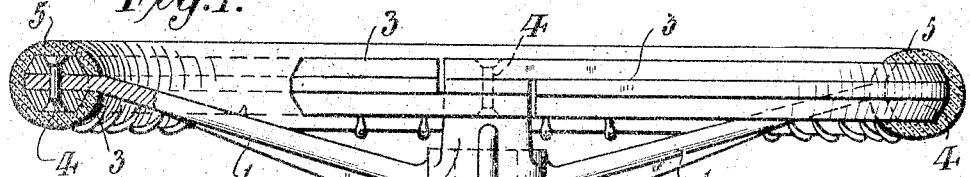
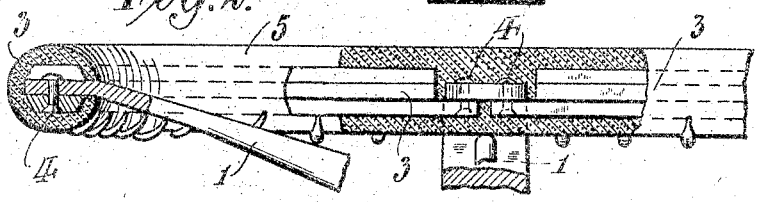
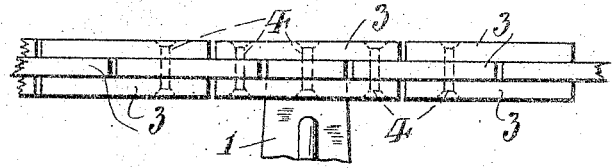
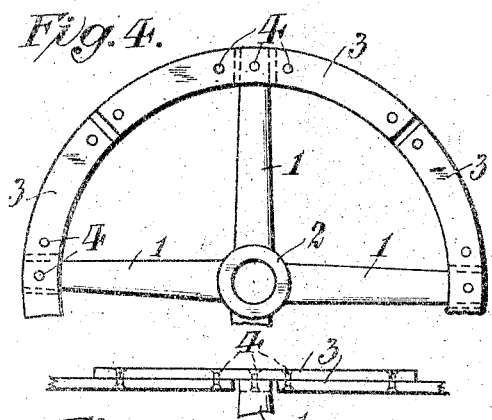
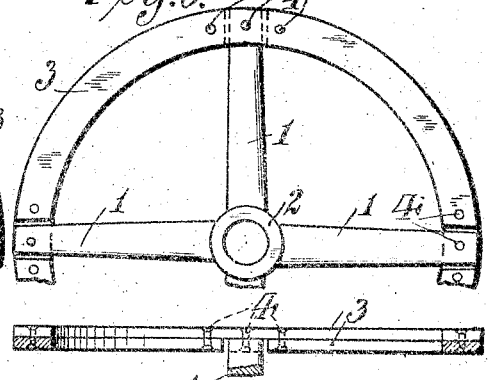
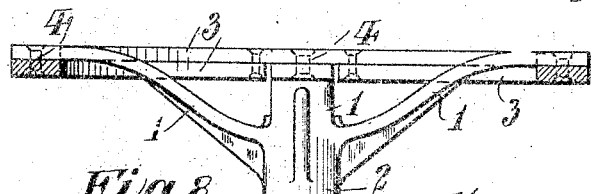

UNITED STATES PATENT OFFICE.

HENRY S. MORGAN, OF TRENTON, NEW JERSEY, ASSIGNOR TO POUVAILSMITH CORPORATION, OF POUGHKEEPSIE, NEW YORK, A CORPORATION OF NEW YORK.

STEERING-WHEEL.

1,220,878.  Specification of Letters Patent.   Patented Mar. 27, 1917.

Application filed December 24, 1914. Serial No. 878,871.

*To all whom it may concern:*

Be it known that I, HENRY S. MORGAN, a citizen of the United States, and a resident of Trenton, Mercer county, State of New Jersey, have invented an Improvement in Steering-Wheels, of which the following description, in connection with the accompanying drawings, is a specification, like letters on the drawings representing like parts.

The present invention relates to steering wheels, the object being to provide a wheel having a grip portion of comparatively light but durable structure.

I have illustrated several embodiments of my invention in the accompanying drawings in which—

Figure 1 is a side view of a steering wheel with parts broken away and the rim disclosed in cross section to show the interior structure;

Figs. 2, 3 and 4, 5, 6, and 7 illustrate a number of modifications thereof, and

Fig. 8 is a side view illustrating a modified form of spider adapted to be used with the frame shown in Figs. 6 and 7.

Figure 9:
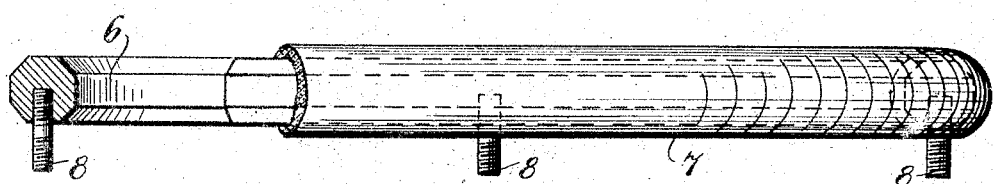
Fig. 9 represents a portion of rim of a steering wheel of the type in which the grip is built up as a unit separately from the spider portion.

Referring now to Fig. 1 of the drawings, a suitable spider member having arms 1 extending from a hub 2 is adapted to support a grip portion or rim which may comprise a core or frame of suitable material and a shell of plastic material inclosing said core. In a preferred embodiment of my invention, illustrated in the said figure, the core comprises a plurality of members 3, which may be conveniently formed out of wood or other suitable material, said members being attached to the ends of the spider arms, thus forming a substantially continuous framework, the parts of which may be fastened together and to the arm ends by suitable attaching means, as rivets 4. This core and the arm ends included in its periphery may be inclosed in a shell 5 of plastic material preferably of a nature to resist extremes of heat or cold, as for example, bakelite, condensite, or a similar substance.

Figure 10:
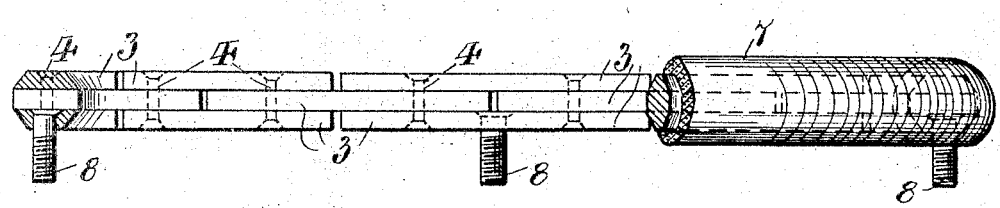
Fig. 10 is a similar view in which the frame is shown as composed of a plurality of separate members and, Fig. 11 is a side view with the rim frame in cross section illustrating the frame attached to a suitable spider.
Figure 11:
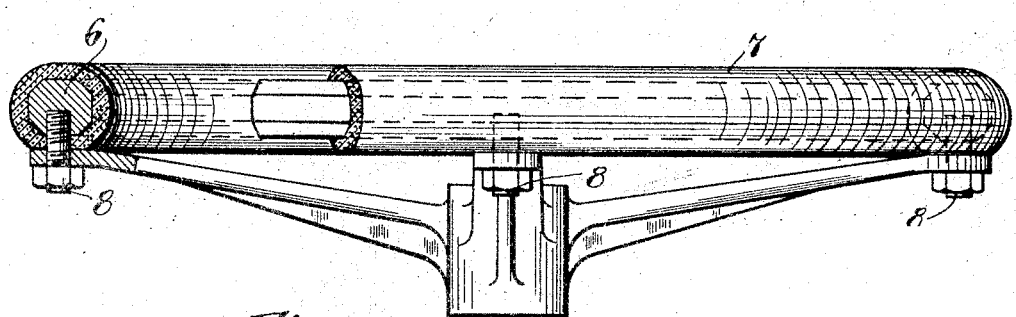

In Figs. 9 to 11 inclusive, I have illustrated a modified form of wheel in which the composite grip portion may be formed as a separate unit with its covering of plastic material and thereafter be mounted upon a suitable spider member to form a steering wheel. Referring to Fig. 9, I have shown a grip with a core 6 comprising a single piece of wood or other similar material preferably of fibrous texture incased in a shell 7 of condensite, bakelite or a similar substance. It is contemplated that this grip may be attached to a spider by any suitable means, as a screw or a nut and bolt, as illustrated in Fig. 11. According to this figure, threaded bolts 8 may be set into the core 6 at suitable intervals, with portions projecting to engage corresponding holes or slots in the spider arms. Instead of using a single piece of wood, as illustrated in Fig. 9, I prefer to build up the grip frame in a manner substantially similar to that hereinabove described, that is, by means of individual short lengths suitably fastened together, as by rivets, to form the core. This composite core may then be incased in a shell of plastic material to form the completed grip portion.

From the foregoing description, and the drawings referred to therein, it will be clear that a steering wheel made in accordance with my invention will possess distinct advantages over the steering wheel having a homogeneous grip, composed entirely of metal or of any other single substance. Probably the material most commonly used is hard rubber. It has been found, however, that hard rubber does not resist the action of extreme heat or cold and is very often cracked by a sudden change in temperature, particularly when it is associated with a metal or with other materials. Where condensite or bakelite is used, this difficulty is obviated. It is also possible, by the use of such a material, to use a comparatively small amount thereof, the remainder of the bulk of the grip portion being composed of cheaper and lighter material such as wood.

A further object of the present invention has been to reduce as far as possible the amount of metal necessary in the construction of the steering wheel. Hitherto, the ordinary steering wheel frame has been made in a single casting, including a hub, a suitable number of spider arms, and a rim frame connecting with the ends of the spider arms, thus producing a more elastic structure and at the same time one in which there is considerable economy in the saving of metal.

A further object of the invention has been to produce a separate composite steering wheel grip which may be attached to different forms of spiders in any suitable manner.

It will be understood that in the claims which follow, the phrase "core composed entirely of light permeable material" and the phrase "core composed entirely of wood" refer to the body material of the core and do not include any fastening means which might be employed to hold different parts of the body of the core together where the core body might be made up of separate pieces.

I claim as my invention:

1. A steering wheel comprising in combination rim supporting means, a core composed entirely of light permeable material, and a rim cover of molded plastic material permeating the said core and thereby causing it to be strengthened and stiffened so as to serve as a reinforcing band as well as a filler for the rim.

2. A steering wheel comprising in combination with a hub and rim supporting arms, a core composed entirely of wood and secured to the arms, and a condensite cover molded thereon under pressure, whereby the condensite is caused to permeate the wooden core to strengthen and stiffen the same for the purpose specified.

In testimony whereof, I have signed my name to this specification, in the presence of two subscribing witnesses, this 19th day of December, 1914.

HENRY S. MORGAN.

Witnesses:
W. A. FURMAN,
JOHN W. THOMPSON.